No. 692,660. Patented Feb. 4, 1902.
G. W. HENRY.
CULTIVATOR.
(Application filed Oct. 19, 1901.)
(No Model.)
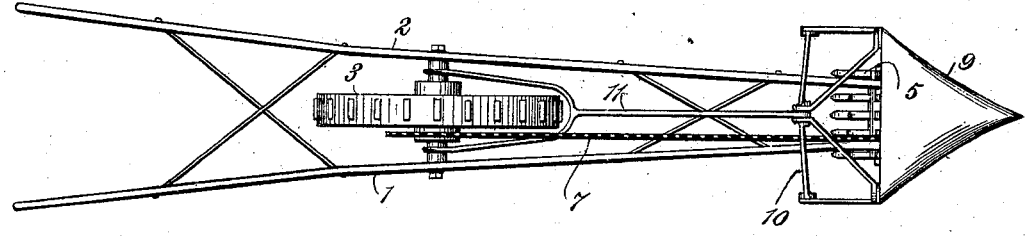
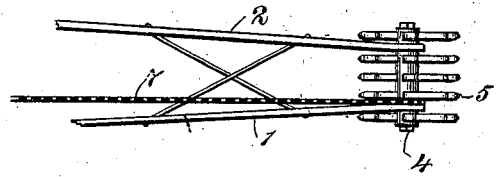
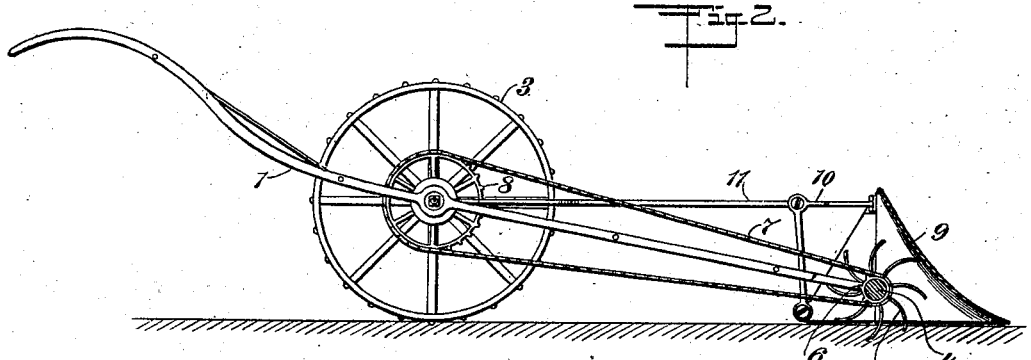
WITNESSES:
INVENTOR
George W. Henry
BY
ATTORNEYS

UNITED STATES PATENT OFFICE.

GEORGE W. HENRY, OF OIL CITY, PENNSYLVANIA.

CULTIVATOR.

SPECIFICATION forming part of Letters Patent No. 692,660, dated February 4, 1902.

Application filed October 19, 1901. Serial No. 79,232. (No model.)

*To all whom it may concern:*

Be it known that I, GEORGE W. HENRY, a citizen of the United States, and a resident of Oil City, in the county of Venango and State of Pennsylvania, have invented a new and Improved Cultivator, of which the following is a full, clear, and exact description.

This invention relates to improvements in cultivators, the object being to provide a cultivator of simple construction that may be easily operated to effectually break up the ground under and around plants without danger of breaking or cutting the plants.

I will describe a cultivator embodying my invention and then point out the novel features in the appended claims.

Reference is to be had to the accompanying drawings, forming a part of this specification, in which similar characters of reference indicate corresponding parts in all the figures.

Figure 1 is a plan view of a cultivator embodying my invention. Fig. 2 is a side view, partly in section; and Fig. 3 is a plan view with the hood removed.

The cultivator comprises handles 1 2, in which are formed bearings for the shaft of a traction-wheel 3. Arranged in the forward portions of the handles is a shaft 4, on which are secured curved cultivator or chopping fingers 5. As here shown, there are five series of said fingers 5; but a greater or less number may be employed without departing from the spirit of my invention. On the shaft 4 is a sprocket-wheel 6, from which a sprocket-chain 7 extends to a sprocket-wheel 8 on the shaft of the traction-wheel 3. Therefore it will be seen that as the cultivator is moved forward rotary motion will be imparted to the cultivator or chopping fingers 5 from the traction-wheel 3.

To prevent the chopping-fingers from coming in contact with plants or the like, I arrange a hood 9 over said fingers. This hood has its top and side walls extended forward to a point, the lower portion being open. The hood is attached to a frame 10, having swinging connection with a rod 11, extended from the shaft of the traction-wheel. During the forward movement of the machine the hood 9 will ride upon the ground, and the swinging connection of the frame with the rod 11 will permit the hood to adjust itself to the formation of the ground.

Instead of the sprocket mechanism shown it is obvious that a train of gear-wheels may be employed for driving the cultivator-shaft.

Having thus described my invention, I claim as new and desire to secure by Letters Patent—

1. A cultivator, comprising handles, a traction-wheel, a shaft arranged at the forward portion of the handles, cultivator-fingers on said shaft, a hood over the fingers and driving connections between said shaft and the traction-wheel, substantially as specified.

2. A cultivator, comprising handles, a traction-wheel having its shaft-bearings in said handles, a shaft at the forward end of the handles, curved fingers on said shaft, a hood over the fingers, a sprocket-wheel on said shaft, a sprocket-wheel on the shaft of the traction-wheel, and a chain connection between said sprocket-wheels, substantially as specified.

3. A cultivator, comprising handles, a traction-wheel supporting said handles, a shaft arranged at the forward portion of the handles, a driving connection between said shaft and the traction-wheel, cultivator-fingers on said shaft, and a hood arranged over said fingers, substantially as specified.

4. A cultivator, comprising handles, a traction-wheel supporting the handles, cultivator-teeth arranged at the forward portion of the handles, a driving connection between said cultivator-teeth and the traction-wheel, a rod extended from the shaft of the traction-wheel, a frame having swinging connection with said rod, and a protecting-hood connected to said frame, substantially as specified.

In testimony whereof I have signed my name to this specification in the presence of two subscribing witnesses.

GEORGE W. HENRY.

Witnesses:
 MARGARET R. COURTNEY,
 WILLIAM M. PARKER.